Nov. 4, 1947.  W. C. BAUER  2,430,097
LUBRICATING SYSTEM
Filed June 25, 1942
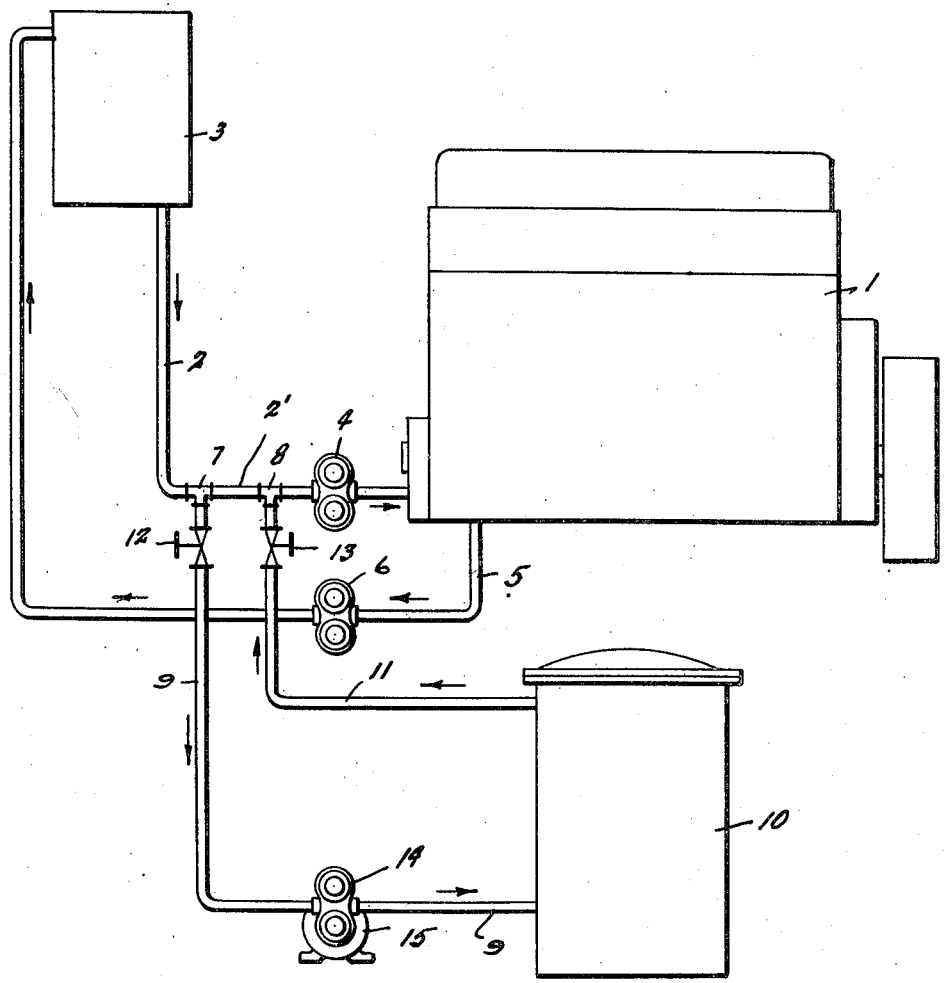
Inventor
WALTER C. BAUER
By Semmes, Keegin, Beale & Semmes
Attorneys Patented Nov. 4, 1947

2,430,097

UNITED STATES PATENT OFFICE 2,430,097

LUBRICATING SYSTEM

Walter C. Bauer, Chevy Chase, Md., assignor, by mesne assignments, to The Briggs Filtration Company, Bethesda, Md., a corporation of Maryland Application June 25, 1942, Serial No. 448,465

10 Claims. (Cl. 184—6)

This invention relates to lubricating systems and more particularly has reference to methods of lubrication and lubricating systems for internal combustion engines and other mechanisms in which the oil supplied to the parts thereof to be lubricated is passed through a clarifier.

The advantages of the clarification of oil for use in internal combustion engines and other mechanisms has long been recognized and various installations of clarifying units in conjunction with the lubricating systems of engines and other mechanisms have been made. In certain types of internal combustion engines and other mechanisms, it is preferred or necessary to provide a storage tank for a body of oil and to conduct oil under pressure from said storage tank to the parts to be lubricated, collect the oil after having effected the desired lubrication and return it to the storage tank. In utilizing a clarifier in this type of lubricating system, the clarifier is generally positioned between the storage tank and the parts to be lubricated so that the oil withdrawn from the storage tank will be clarified before being brought into engagement with the surfaces to be lubricated.

Such an installation has the disadvantage that when the clarifying unit is ready to be replaced the system must be cut off which involves stoppage of the engine or other mechanism. In some instances by-passes have been provided to enable the lubrication to proceed even after the clarifying unit has been clogged with impurities to such an extent that the rate of flow therethrough has been partially reduced. While such installations permit the engine or mechanism to be lubricated after clogging or reduction in the capacity of the clarifying element, nevertheless, the engine or other mechanism must be stopped before the replaceable element within the clarifier can be renewed.

Another disadvantage is the time consumed in heating the oil to free flowing condition when starting the engine cold.

An object of the present invention is to avoid the disadvantages of the prior art lubricating systems as pointed out hereinbefore.

Another object of this invention is to provide in a lubricating system for internal combustion engines and other mechanisms a clarifying unit about which the oil may be automatically by-passed without any reduction in the rate of supply to the surfaces to be lubricated.

A further object of this invention is to provide a lubricating system for internal combustion engines and other mechanisms in which oil is passed from a supply tank through a supply conduit to the parts to be lubricated and in which a clarifying unit has its intake connected to one point in the supply conduit and has its outlet connected at another point in the supply conduit between the first point of connection and the parts to be lubricated and in which independent means are provided for withdrawing oil from the supply conduit, passing it through the clarifier, and returning it to said supply conduit.

Still another object of this invention is to provide a method and apparatus for clarifying oil passing through a supply line from a reservoir to an internal combustion engine or other mechanism having parts to be lubricated in which oil is withdrawn from the supply conduit at a point intermediate the reservoir and the parts to be lubricated, passed through a clarifying unit, and returned to the supply conduit at a point intermediate the point of withdrawal and the parts to be lubricated and in which the oil is withdrawn from the supply conduit and passed through the clarifier and returned to the supply conduit at a rate greater than the rate of flow from the reservoir to the parts to be lubricated.

With these and other objects in view, the present invention resides in the procedure, parts and combinations illustrated in the drawings and described hereinafter.

To facilitate an understanding of the present invention, a system embodying the principles of the present invention has been illustrated in the accompanying drawings in which:

The single figure is a somewhat diagrammatic representation of a lubricating system for an internal combustion engine having a clarifying unit associated therewith in accordance with the principles of the present invention.

For purposes of illustration, the present invention has been shown embodied in a lubricating system of an internal combustion engine of the type in which a body of lubricating oil is maintained in a reservoir from which it is pumped to portions of the engine to be lubricated, collected and returned to the reservoir. In this connection, an internal combustion engine 1 is shown having an oil supply conduit 2 extending from an oil reservoir 3 and leading to the lubricant ducts (not shown) in the engine 1. The oil supply conduit 2 is provided with a pressure pump 4 positioned immediately adjacent the engine 1 and preferably driven directly by said engine. Means within the engine are provided for collecting the oil after it has effected lubrication and a discharge conduit 5 is provided for conducting the oil back to the reservoir 3. To effect the flow of oil through the discharge conduit 5, a gear pump 6 or a pump of other type is provided. The pumps 4 and 6 may have a common drive shaft, or in any event are both driven by a rotary portion of the internal combustion engine 1.

In accordance with the present invention, the supply conduit 2 is provided with T-fittings 7 and 8 between the reservoir 3 and the pressure pump 4. The leg of the T-fitting 7 is connected by an intake conduit 9 with the inlet port of a clarifying device 10. A conduit 11 extends between the outlet port of the clarifier 10 and the leg of the T-fitting 8. Valves 12 and 13 are interposed in the conduits 9 and 11, respectively, to enable the clarifying unit to be shut off completely from the supply conduit 2.

For withdrawing lubricating oil from the supply conduit 2, a gear pump 14 or other type of pump is provided in the intake conduit 9 and is driven by a separate source of power such as an electric motor 15.

One of the features of the present invention resides in providing a clarifier 10 of large capacity and in creating a flow of lubricating oil through the clarifier at a rate higher than that of the flow of oil to the engine under maximum running conditions so that there will always be an ample supply of clarified oil for the parts to be lubricated. For this purpose it is desired that the clarifier be of sufficiently large size and that the pump 14 be of a capacity greater than that of pumps 4 and 6. For instance, pumps 4 and 6 in certain installations may have a capacity of about 20 gallons per minute, whereas pump 14 would have a capacity of 25 gallons per minute.

Due to the greater rate of flow of oil through the pump 14, the conduits 9 and 11 and the clarifier 10 and also due to the fact that the pump 4 withdraws considerably less oil than is circulated by pump 14, a portion of the clarified oil introduced into the conduit 2 at the T-fitting 8 will be diverted through the portion 2' of the conduit 2 between the fittings 7 and 8 in a direction opposite to the flow of the oil through the rest of the conduit 2 as indicated by the arrows. Thus, a portion of the clarified oil introduced into the conduit 2 through the fitting 8 will be re-circulated along with oil supplied from the reservoir 3 back through the clarifier 10.

While the rate of flow of oil through the clarifier 10 and the conduits is normally greater than the amount drawn by the pump 4, nevertheless, in certain instances the rate of flow through the clarifier may be reduced due to temperature conditions such as occur when starting a cold engine or in cases in which the clarifying unit is partly clogged with impurities. Under these conditions the portion of the conduit 2' being of the same cross section as the rest of the conduit 2 will permit the free flow of oil from the reservoir 3 directly to the pump 4. Due to the excess capacity of the pump 14 over the pump 4 and the flow of oil through by-pass 2' in a direction opposite to the flow through conduit 2, the wide open by-pass 2' in effect will be normally closed against the direct flow of oil from the reservoir 3 to the pump 4, but under abnormal conditions, as pointed out above, the oil can readily flow from the reservoir 3 through by-pass 2' to the pump 4 without any restriction.

In the event that the clarifier becomes sufficiently clogged as to seriously impair its operation, the valves 12 and 13 may be closed without stopping the operation of the engine 1 since the oil can freely flow from the reservoir 3 to the pump 4 through the by-pass 2'. After the valves 12 and 13 are closed, the replaceable element within the clarifier may be removed and a new refill inserted. By providing a separate drive element 15 for the pump 14, the flow of oil through the clarifier will be maintained at a maximum, even under low speed operation of the engine 1 so that in the event that a speed-up in the engine suddenly occurs there will be an ample supply of clarified oil for immediate use in the engine. This is quite important as in the present day systems an immediate speed-up in the operation of the engine will not instantaneously provide a supply of oil commensurate with the requirements of the engine under the higher speeds.

Another advantage of the system of the present invention resides in the fact that due to the wide open by-pass 2' an ample flow of oil is provided even when the engine is cold, as all of the oil drawn through the pump 4 will not necessarily have to be forced through the clarifying unit 10. However, as the engine becomes warmer and the oil is heated up, the rate of flow through the clarifier will be increased until normal conditions of operation exist and the excess flow through the clarifier over the requirements of the pump 4 are obtained.

From the foregoing description, it will be appreciated that the present invention provides a novel arrangement of the clarifying apparatus in conjunction with the lubricating system of an internal combustion engine or other mechanism and a method of operation in which the oil can be automatically by-passed around the clarifying unit and in which the circulation of oil through the clarifier is independent of the engine speed and rate of flow through the pressure and discharge pumps of the lubricating system.

I claim:

1. A system for lubricating internal combustion engines and other mechanisms comprising an oil supply tank, a supply conduit connecting the tank and mechanism for conveying oil from the tank to the mechanism, a discharge conduit connecting the mechanism and tank for the discharge of oil from the mechanism to the tank, a clarifier having an intake conduit connected to said supply conduit and an outlet conduit connected to said supply conduit at a point intermediate the mechanism and the point of connection of the intake conduit, means for circulating oil between the supply tank and mechanism and means independent of the circulating means and having a greater flow capacity than said circulating means for setting up a flow of oil through the clarifier at a higher rate than that at which the oil is circulated by said circulating means.

2. A system for lubricating internal combustion engines and other mechanisms comprising an oil supply tank, a supply conduit connecting the tank and mechanism for conveying oil from the tank to the mechanism, a discharge conduit connecting the mechanism and tank for the discharge of oil from the mechanism to the tank, a clarifier having an intake conduit connected to said supply conduit and an outlet conduit connected to said supply conduit at a point intermediate the mechanism and the point of connection of the intake conduit, a pressure pump in said supply conduit between the outlet conduit and the mechanism, a scavenging pump in said discharge conduit, and an independently actuated pump interposed between the supply conduit and the clarifier and having a higher capacity than the pressure pump to create a flow through the latter at a rate higher than that at which oil flows through the supply conduit.

3. In a lubricating system for internal combustion engines having an oil reservoir, a supply conduit extending between the reservoir and the engine, means for effecting a flow of oil from the reservoir to said engine, a clarifier, an intake conduit connecting the inlet of the clarifier with the supply conduit, an outlet conduit connecting the outlet of the clarifier with the supply conduit at a point between the engine and the point of connection of the intake conduit, and pumping means in the intake conduit having a greater flow capacity than said flow effecting means for withdrawing oil from the supply conduit, forcing it through the clarifier and returning it to the supply conduit at a rate higher than the rate of flow between the reservoir and the engine.

4. In a lubricating system for internal combustion engines having an oil reservoir, a supply conduit extending between the reservoir and the engine, means for effecting a flow of oil from the reservoir to said engine, a clarifier, an intake conduit connecting the inlet of the clarifier with the supply conduit, an outlet conduit connecting the outlet of the clarifier with the supply conduit at a point between the engine and the point of connection of the intake conduit, and pumping means in the intake conduit having a greater flow capacity than said flow effecting means for withdrawing oil from the supply conduit, forcing it through the clarifier and returning it to the supply conduit at a rate higher than the rate of flow between the reservoir and the engine whereby the flow of oil through the portion of the supply conduit between the points of connection of the intake and outlet conduits will be in a direction opposite that of the oil through the other portions of the supply conduit to prevent unclarified oil reaching the engine.

5. Clarifying apparatus for a lubricating system for internal combustion engines provided with an oil reservoir, a supply line from the reservoir to the engine and an oil pressure pump, comprising a clarifier, an intake conduit for conducting oil from the system to the clarifier, an outlet conduit for conducting clarified oil from the clarifier to the system, a pump connected to the intake conduit for withdrawing oil from the system, passing it through the clarifier and returning it to the system, said last mentioned pump having a greater capacity than the oil pressure pump, for effecting a passage of oil from the outlet conduit through a section of the supply line to the intake conduit.

6. Clarifying apparatus for a lubricating system for internal combustion engines provided with an oil reservoir, an oil supply line from the reservoir to the engine and an oil pressure pump, comprising a clarifier, an intake conduit for conducting oil from the system to the clarifier, an outlet conduit for conducting clarified oil from the clarifier to the system, said conduits connecting with the supply line, a pump connected to the intake conduit for withdrawing oil from the system, passing it through the clarifier and returning it to the system, said last mentioned pump having a greater capacity than the oil pressure pump, for effecting a passage of oil from the outlet conduit to the supply line whereby part of the clarified oil is directed toward the engine and the remainder toward the reservoir.

7. In a lubricating system for internal combustion engines having an oil reservoir, an oil clarifier, an inlet conduit connecting said clarifier and the reservoir, an outlet conduit connecting said clarifier and the engine, a pump connected to said inlet conduit for withdrawing oil from said reservoir and forcing it through said clarifier and said outlet conduit, and an open by-pass conduit extending between the intake of the pump and the outlet conduit for recirculating a portion of the oil discharged from the clarifier back through the pump and clarifier.

8. For use with a lubricating system for internal combustion engines having an oil reservoir and means for passing oil from the reservoir to the engine, a clarifying apparatus comprising an oil clarifier, conduits to deliver oil from said reservoir to said clarifier, pumping means for circulating more oil through the clarifier than the engine requires, means for delivering the oil required by the engine from the clarifier to the means for passing oil from the reservoir to the engine and means for recirculating the excess clarified oil through the clarifier.

9. In a lubricating system for internal combustion engines having an oil reservoir, a pressure pump for delivering oil to the engine and means for passing used oil from the engine to the reservoir, an oil clarifier, means for passing oil from the reservoir to the clarifier, a pump of greater capacity than said pressure pump for circulating oil through the clarifier at a greater rate than the engine requires, means for passing a portion of the clarified oil to the engine and means for recirculating the excess oil through the clarifier.

10. In a lubricating system for internal combustion engines having a reservoir and a supply conduit for conveying lubricant from the reservoir to the engine at a given rate, a clarifier, an intake conduit connecting said supply conduit and said clarifier, an outlet conduit connecting said clarifier to said supply conduit at a point between the engine and the connection of said intake conduit to said supply conduit, and a pump connected to said intake conduit for withdrawing lubricant from said supply conduit at a greater rate of flow than said given rate, passing it through the clarifier and outlet conduit, and reintroducing the clarified lubricant into said supply conduit at a point between the engine and said point of withdrawal, whereby said given rate of clarified oil will flow to the engine and the excess will flow to the pump for recirculating through the clarifier.

WALTER C. BAUER.

REFERENCES CITED

The following references are of record in the file of this patent:

UNITED STATES PATENTS

| Number | Name | Date |
|---|---|---|
| 1,590,120 | Perry | June 22, 1926 |
| 2,141,798 | Peterson | Dec. 27, 1938 |
| 1,384,873 | Strickland | July 19, 1921 |
| 1,020,774 | Nilson | Mar. 19, 1912 |
| 1,805,230 | Ayres | May 12, 1931 |
| 1,250,036 | Shipley | Dec. 11, 1917 |
| 1,638,281 | Winslow | Aug. 9, 1927 |
| 1,656,200 | Horning | Jan. 17, 1928 |